United States Patent
Bröckel et al.

(10) Patent No.: US 7,159,314 B2
(45) Date of Patent: Jan. 9, 2007

(54) METHOD FOR MAKING A CYLINDER

(75) Inventors: Klaus Bröckel, Sao Leopoldo (BR); Hartmut Fischer, Remshalden (DE); Heiko Rosskamp, Adelberg (DE); Helmar Amend, Waiblingen (DE); Igor Klaric, Korb (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 346 days.

(21) Appl. No.: 10/664,944

(22) Filed: Sep. 22, 2003

(65) Prior Publication Data

US 2005/0166396 A1 Aug. 4, 2005

(30) Foreign Application Priority Data

Sep. 19, 2002 (DE) ............... 102 43 520

(51) Int. Cl.
*B23P 11/00* (2006.01)
(52) U.S. Cl. .................. 29/888.06; 29/557
(58) Field of Classification Search ....... 29/888.06, 29/888.07, 557
See application file for complete search history.

(56) References Cited

U.S. PATENT DOCUMENTS 6,041,499 A * 3/2000 Matsuura et al. ........ 29/888.06
6,729,274 B1 * 5/2004 Matuura et al. ........... 123/65 P
2004/0107571 A1 * 6/2004 Leiendecker ............. 29/888.06

FOREIGN PATENT DOCUMENTS

| JP | 49-73515 | | 7/1974 |
| JP | 58155114 | | 9/1983 |
| JP | 2-197388 | * | 2/1990 |
| JP | 407097969 A | * | 4/1995 |
| JP | 10252552 | | 9/1998 |

OTHER PUBLICATIONS

"Schematic Trimming Technique for Automatization", K.K. Kogyo Chosakai Publishing Co. Ltd., Oct. 15, 1994, pp. 47 and 98.

* cited by examiner

*Primary Examiner*—Marc Jimenez
(74) *Attorney, Agent, or Firm*—Walter Ottesen

(57) ABSTRACT

A cylinder housing (1) is cast with a cylinder wall (2) in the making of a cylinder for an internal combustion engine. The cylinder wall delimits an interior space (3) for accommodating a reciprocating piston and, thereafter, a control window (5) is machined into the cylinder wall (2) as an opening of a transfer channel (4) into the interior space (3). A two-stage machining for forming the control window (5) is provided in order to make possible a rapid and cost effective manufacture of the cylinder. In a first step with a work tool (7) having a rotating primary movement (11), a breakthrough (10) is machined into the cylinder wall (2) and, in a second step with a work tool, the breakthrough (10) is widened to the wanted dimensions of the control window (5).

13 Claims, 3 Drawing Sheets

METHOD FOR MAKING A CYLINDER

CROSS REFERENCE TO RELATED APPLICATIONS

This application claims priority of German patent application no. 102 43 520.0, filed Sep. 19, 2002, the entire content of which is incorporated herein by reference.

BACKGROUND OF THE INVENTION

U.S. Pat. No. 6,041,499 discloses a method wherein a cylinder housing is cast having a cylinder wall which delimits an interior space for accommodating a reciprocating piston. The cylinder is provided for a two-stroke engine and therefore transfer channels enclosed in the cylinder wall are provided. The combustion chamber is delimited by the piston. The supply of the combustion chamber in the cylinder with the fuel mixture or air is ensured via the transfer channels in a manner known per se. The transfer channel runs essentially axially in the cylinder wall and, to connect the transfer channel to the interior of the cylinder, a radial control window is provided in the cylinder wall which is cyclically covered and again cleared by the stroke piston during operation of the engine.

In the known method, a blank of the cylinder housing is first cast which is provided only with the flow channels enclosed in the cylinder wall so that the blank cylinder body can be cast with a high degree of efficiency and a savings of manufacturing costs. In a second method step for making the cylinder, a control window is machined in for each transfer channel with a non-contact machining process, for example, an electric discharge machining process. The known method assumes that a precise machining in the formation of the control window in the cylinder wall is only possible with a non-contact machining process. In the known non-contact machining process of the control windows, a work tool is introduced into the cast blank cylinder body and is brought into position at the wall section of the cylinder wall where the control window is intended to be cut out in the cylinder wall for connection with the still hidden transfer channel.

The manufacture of cylinders with the known method, however, requires costly processing machines to effect a non-contact cutting out of the control windows in the cylinder wall. In the manufacture of cylinders for small internal combustion engines such as those used in portable handheld work apparatus, the non-contact machining leads to high manufacturing costs of the cylinder and therefore of the engine. This is especially unacceptable when manufacturing in large quantities.

SUMMARY OF THE INVENTION

It is an object of the invention to provide a method of the kind described above which makes possible a rapid and cost effective manufacture of the cylinder.

The method of the invention is for making a cylinder for an internal combustion engine. The method includes the steps of: casting a cylinder housing having a cylinder wall delimiting an interior space for accommodating a reciprocating piston; forming a control window into the cylinder wall with a multi-step machining of the cylinder wall which includes: a first step of forming a breakthrough in the cylinder wall utilizing a chip removing work tool having a rotating primary movement; and, a second step of widening the breakthrough to a wanted dimension of the control window utilizing a work tool.

According to the invention, a cost-effective manufacture of the cylinder is achieved with a two-stage machining in the formation of the control window in the cast cylinder housing. In a first step, the cylinder wall is broken through in the intended location of the control window with a chip-removing tool with a rotating primary movement and, in a second step, the breakthrough is widened to the planned dimensions of the control window with a work tool having a preferably linear primary movement. In this way, a large part of the required material removal for cutting out the control window is carried out with a rotating primary movement with a cost-effective manufacturing method. Burrs remain from the rotating primary movement of the work tool in the first step and these burrs can be cleanly removed with a straight-line machining and the precise dimensions of the control window can be machined. The machining according to the invention in the second step can be cost effectively carried out preferably with a work tool having an especially straight-line primary movement and, as may be required, even with the same processing machine.

The combination according to the invention of two machining steps with a first rotating machining operation and thereafter the completion of the control window with another work tool makes possible a precise formation of the control window for each transfer channel with the manufacturing costs clearly reduced relative to the known method.

The breakthrough of the cylinder wall in the first step of forming the control window advantageously takes place by milling. A breakthrough can be formed with a dimension corresponding already to the intended elevation of the control window in axial direction of the cylinder when a side-milling cutter is used having the cutting width corresponding to the elevation. The machining of the control window in the cylinder wall can be further accelerated when the first machining step takes place with a work tool having a rotating primary movement up to a cut of the work tool into the cylinder wall corresponding to the intended width of the control window in the peripheral direction of the cylinder.

The second machining step takes place preferably with a tool having a linear primary movement, preferably, with a drilling tool and especially a broach or scraping tool. The tool to be guided linearly is aligned into a work position by a machine tool driving the work tool and is driven by the transverse feed movement of the machine tool in the primary movement direction. Preferably, the machining with the linear primary movement takes place with a rotatingly driven work spindle. The feed movement in the rotational operation of the spindle forms the primary movement of the tool in the linear movement. In this way, the first processing step with a rotating cutting movement and the linear primary movement in the second step can be carried out with the same machine tool and, in this way, the machining time is reduced with a very short changeover for the new work tool for the second machining step.

In a further embodiment of the invention, the rotatingly driven work spindle with the work tool to be guided linearly is brought into the work position within the cylinder housing for the second step and the work tool is rotated in a direction with a suitable attack angle with reference to the position of the control window. Thereafter, the work spindle with the work tool is moved back and forth in the straight line primary movement and the chip-removing machining operation is undertaken. At the end of the machining, a removal of burrs can be undertaken on the finished cut-out control window and a cleaning of the edge of the control window can be undertaken. The work tool passes over the edge of the control window with rotating movements matched to the stroke position of the work tool.

In another embodiment of the invention, the second machining step can also take place without contact, preferably, by erosion or utilizing a laser.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
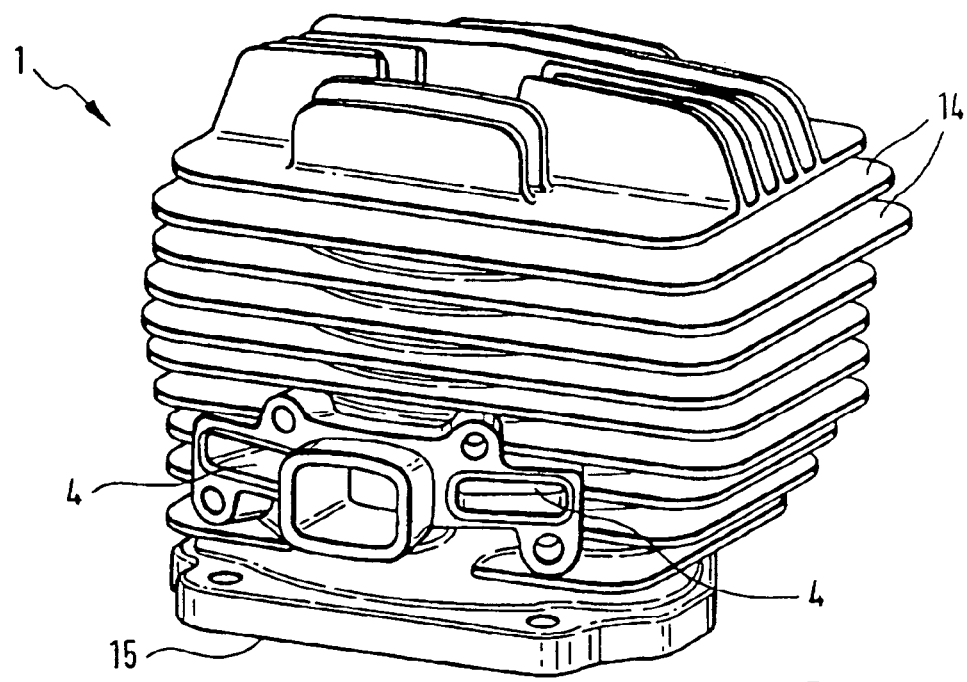
FIG. 1 is a perspective view of a cylinder housing.
Figure 2:
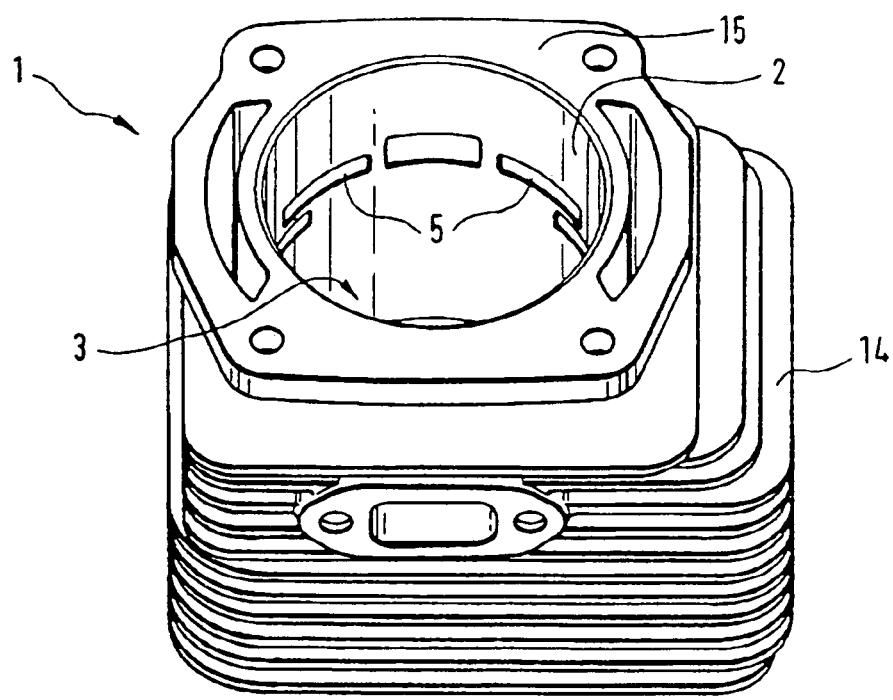
FIG. 2 is a perspective plan view of the cylinder housing.

FIGS. 1 and 2 show a cylinder housing 1 for an internal combustion engine of a portable handheld work apparatus which is originally formed as a pressure die cast part and delimits with a cylinder wall 2 an interior space 3 for accommodating a reciprocating piston. The cylinder wall 2 is equipped with cooling ribs 14 on its outer side for air cooling the cylinder. The cylinder housing 1 is cast integrally and is open at one end for insertion of the reciprocating piston. The open end is configured with a planar flange 15 for connecting to an engine block. Control windows 5 are machined into the cylinder wall 2 and define the openings of transfer channels 4 into the interior space 3 of the cylinder and are opened and closed during operation of the engine for the purpose of a charge exchange by the reciprocating movement of the piston. Depending upon the type of construction of the engine, the transfer channels 4 can supply air or can be supplied with an air/fuel mixture from the crankcase of the engine or from a separate unit for mixture preparation.

In the manufacture of the cylinder housing, the cylinder is cast in a first processing step and, in a second processing step, the radial control windows 5 are cut out as the respective ends of the transfer channels 4 via a milling machining of the cylinder wall. In this way, an integral cylinder housing having a simple cast core for the interior space is produced because complicated cast cores for forming radial undercuts caused by the control windows 5 in the cylinder wall 2 are unnecessary.

The manufacturing method for forming the control windows 5 is explained hereinafter with respect to FIGS. 3 to 6. This manufacturing method can be applied to any formation of essentially radial breakthroughs in the cylinder wall. Accordingly, also inlet channels and outlet channels can be machined in this way or, in addition to the type of construction shown in FIGS. 1 and 2, flow channels can be produced which are connected to the outside of the cylinder wall as can transfer channels enclosed integrally in the cylinder wall and opening into the combustion chamber.

Figure 3:
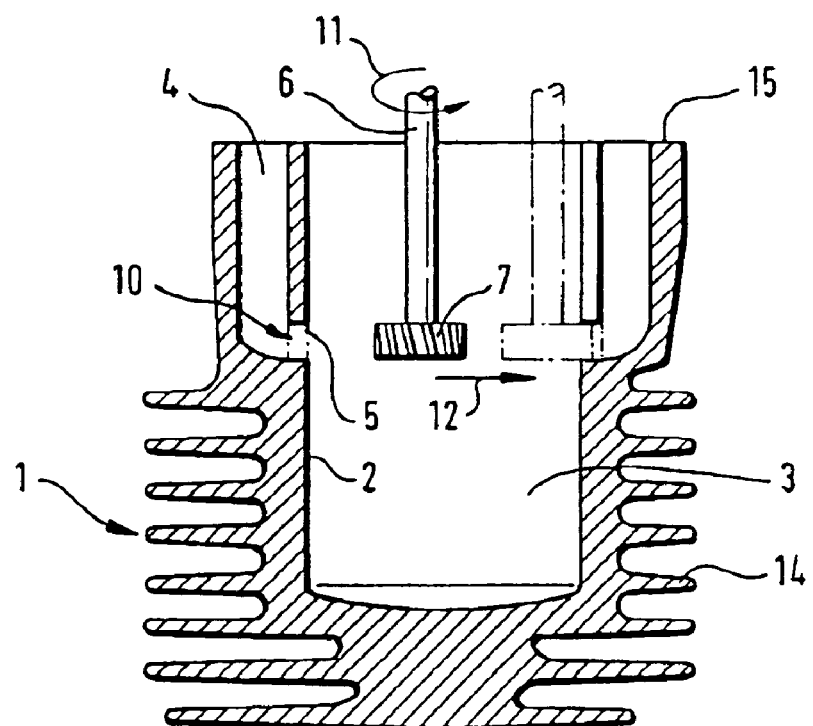
FIG. 3 is a longitudinal section view of a cylinder housing during the machining with a rotating work tool.

FIG. 3 shows a cross section of a cylinder housing 1 for a slot-controlled two-stroke engine. The cylinder housing 1 is manufactured as a pressure-cast part with transfer channels 4 enclosed in the cylinder wall 2. The transfer channels 4 and the interior space 3 form the hollow spaces of the cast; cylinder housing 1 and are originally formed without an undercut whereby, in the cast blank of the cylinder housing 1, the accesses or openings of the transfer channels 4 to the interior space 3 of the cylinder are closed. The transfer channels lie diametrically opposite each other in the embodiment shown. The control windows 5 are formed in the cast blank by mechanical machining of the cylinder wall and define the flow connection of the channels 4 to the interior space 3. A multi-stage metal cutting or machining process is provided for cutting out the control windows 5. In a first step, as shown in FIG. 3, a side-milling cutter 7 is introduced into the interior space 3 of the cylinder housing 1. The interior space 3 is open at the flange 15. The side-milling cutter 7 is mounted at the end of a drive spindle 6 of the machine tool and is brought by the control of the machine tool into the intended work position opposite to the cylinder wall 2 via the drive spindle 6. With the side-milling cutter 7, a breakthrough 10 is cut into the cylinder wall 2 at the position intended for the control window 5. The side-milling cutter 7 with its rotating primary movement 11 is moved with a feed movement 12 in the transverse direction of the cylinder toward the cylinder wall 2 and provides the breakthrough. The width of the cut of the side-milling cutter 7 advantageously corresponds approximately to the wanted axial elevation of the control window 5 so that a one-time cutting thrust is sufficient for the first machining step.

Figure 4:
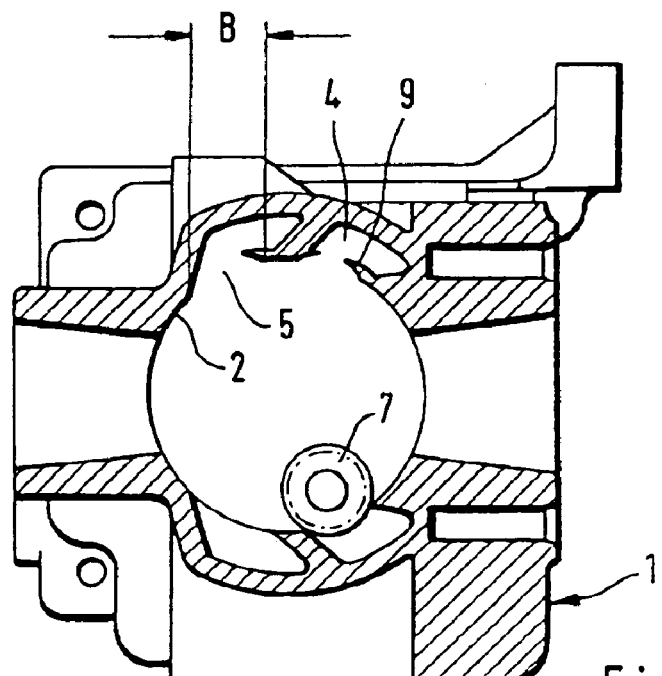
FIG. 4 is a cross section of the cylinder housing during the machining with a rotating work tool.

FIG. 4 shows the side-milling cutter 7 in the machining position in the cylinder wall 2. The cutter head 7 is moved up to a cut in the cylinder wall 2 in correspondence to the width B of the control window 5 in the peripheral direction of the cylinder. As soon as the cut in the cylinder wall corresponds to the width B, the thrust movement of the machine tool is stopped and the cutter head 7 is moved out of the workpiece to permit an exchange of the work tool. A burr having a comma-shaped cross section remains on the edge of the control window 5 because of the rotating primary movement of the work tool during machining with the cutter head 7. The burr is removed in the subsequent machining phase of the multi-stage machining process for forming the control window. This can be carried out without contact via erosion, laser action or like machining operation. Preferably, and after the machining with the rotating cutter head 7, a furrowing tool is clamped to the work spindle 6 and is moved by the work spindle into the work position in the interior of the cylinder housing. The furrowing work tool is to be guided along a straight line and can be a broaching or reaming tool.

Figure 5:
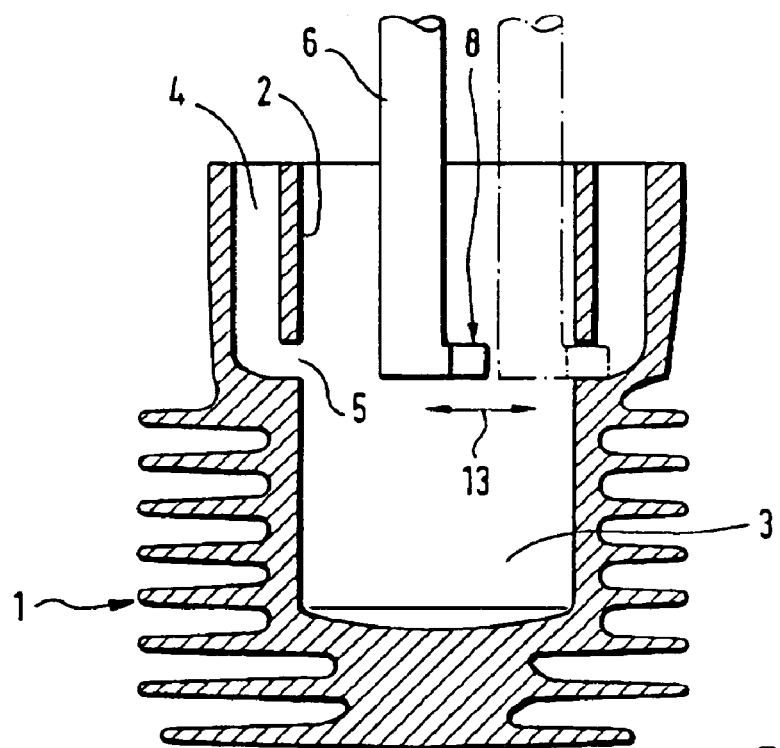
FIG. 5 is a longitudinal section view of the cylinder housing during the machining with a longitudinally-guided work tool; and, FIG. 6 is a cross section of the cylinder housing during machining with a linearly-guided work tool.
Figure 6:
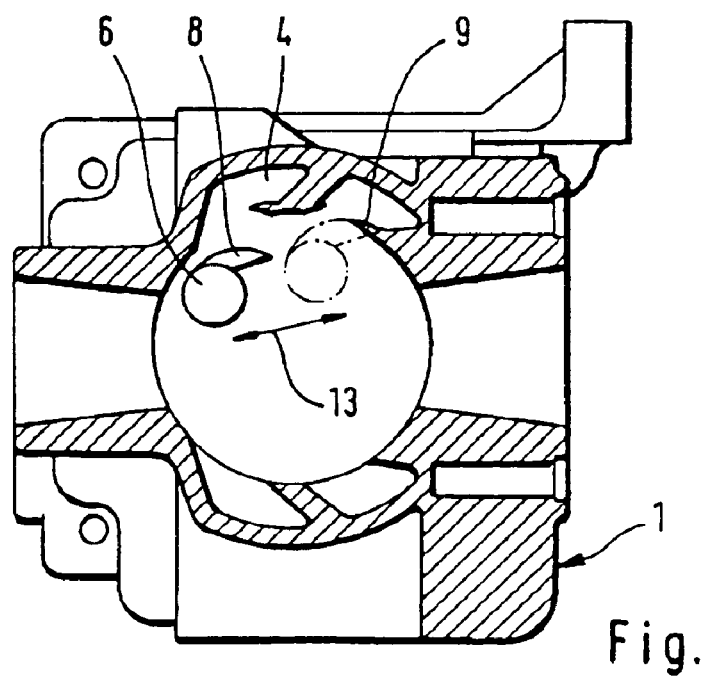

As shown in FIG. 5, the furrowing tool 8 is brought by the work spindle 6 to the axial elevation corresponding to the control window 5 in the interior space 3 of the cylinder housing 1 and, with a linear transverse movement 13, the breakthrough provided by the cutter head 7 is expanded to the wanted dimensions of the control window 5. In advance of the cutting machine operation of the breakthrough with linear movements, and to align the workpiece 8, the work spindle 6 is driven by the control of the machine tool into the suitable position within the workpiece which can be pregiven by a work program. With corresponding rotational movements of the work spindle 6, the furrowing work tool 8 is aligned into the optimal attack angle with reference to the position of the control window 5 in the cylinder wall. After aligning the work tool and for milling or cutting machining, the drive spindle is moved along a straight line without a rotational movement. The thrust movement for the cutting operation determines now the primary movement of the work tool. The drive spindle operates in a plane which is changed by the thrust movement for removing the chips 9 at the edge of the control window 5. It has been shown that the thrust or feed speeds of common machine tools are adequate in order to make possible the linear primary movement in the machining of the control window into accordance with the invention. In this way, for a two-stage machining of the cast blank to form the control windows 5 in the cylinder wall 2, the same machine tool can be used for the milling or cutting operation and for the subsequent machining operation with a work tool guided along a straight line.

As soon as the control window is widened to the wanted dimensions, a cleaning of the edge of the control window or a removal of possibly remaining burrs can take place at the end of the machining in that the work tool is rotated through a suitable angle and the edge of the control window is wiped in synchronism with the straight line back and forth movement.

It is understood that the foregoing description is that of the preferred embodiments of the invention and that various changes and modifications may be made thereto without departing from the spirit and scope of the invention as defined in the appended claims.

What is claimed is:

1. A method for making a cylinder for an internal combustion engine, the method comprising the steps of:
    casting a cylinder housing having a cylinder wall delimiting an interior space for accommodating a reciprocating piston;
    forming a control window into said cylinder wall with a multi-step machining of said cylinder wall which includes:
    a first step of forming a breakthrough in said cylinder wall utilizing a chip removing first work tool having a rotating primary movement; and,
    a second step of widening said breakthrough to a wanted dimension of said control window utilizing a second work tool with a linear primary movement.

2. The method of claim 1, wherein said cylinder wall contains a flow channel enclosed therein and said control window defines an opening of said flow channel into said interior space of said cylinder.

3. The method of claim 1, wherein said second work tool is a furrowing work tool.

4. The method of claim 1, wherein said second work tool is a reaming work tool.

5. The method of claim 1, wherein, with the machining with said linear primary movement, said second work tool is aligned in a work position and is moved with a transverse thrust or feed movement of a machine tool in a direction toward the control window to be machined.

6. The method of claim 1, wherein machining takes place with a linear primary movement with a rotatingly driven work spindle and wherein the thrust provided for the rotational operation of said work spindle defines said primary movement of said second work tool.

7. The method of claim 6, wherein for machining with said linear primary movement, said work spindle is brought into a predetermined work position in said interior space and said second work tool is rotated into an alignment at a suitable attack angle with reference to the position of said control window.

8. The method of claim 7, wherein, after the end of the machining with said second work tool, an edge of said control window is wiped with rotational movements of said spindle matched to the stroke position of said second work tool.

9. The method of claim 1, wherein said chip removing work tool performs a cutting operation.

10. The method of claim 9, wherein said cutting work tool is a side-milling cutter having a cutting width corresponding to the wanted height of said control window in the axial direction of said cylinder.

11. The method of claim 10, wherein the cutting operation takes place up to a cut of said cutting work tool into said cylinder wall which corresponds to the width (B) of said control window in the peripheral direction of said cylinder.

12. The method of claim 1, wherein said second step is carried out utilizing a contactless machining operation.

13. The method of claim 12, wherein said contactless machining operation is an erosion process.

* * * * *